United States Patent [19]

Austin et al.

[11] 4,149,987

[45] Apr. 17, 1979

[54] PROCESS FOR PREPARING HALOGENATED AROMATIC HYDROXY ETHERS

[75] Inventors: Arthur L. Austin, Southgate; William W. Levis, Jr., Wyandotte, both of Mich.

[73] Assignee: BASF Wyandotte Corporation, Wyandotte, Mich.

[21] Appl. No.: 882,078

[22] Filed: Mar. 1, 1978

Related U.S. Application Data

[62] Division of Ser. No. 753,650, Dec. 23, 1976, Pat. No. 4,094,910.

[51] Int. Cl.$^2$ ............... C08K 5/06; C08K 5/50; C07C 41/02
[52] U.S. Cl. ............... 252/186; 260/45.7 P; 521/170; 528/79; 568/610
[58] Field of Search ............... 252/186; 260/613 B, 260/2.5 AJ, 77.5 AR, 45.7 P

[56] References Cited

U.S. PATENT DOCUMENTS

| | | | |
|---|---|---|---|
| 2,807,651 | 9/1957 | Britton et al. | 260/613 B |
| 3,274,129 | 9/1966 | Bailey | 260/613 B |

OTHER PUBLICATIONS

Colclough et al., Jour. of Polymer Science, vol. 34 (1959), pp. 171-174.

*Primary Examiner*—Benjamin R. Padgett
*Assistant Examiner*—Irwin Gluck
*Attorney, Agent, or Firm*—Andrew E. Pierce; Bernhard R. Swick; Robert E. Dunn

[57] ABSTRACT

An oxyalkylated, halogenated product useful in making polyurethane foams is prepared by reacting an epoxide compound with a halogenated aromatic hydroxyl-containing compound (phenol) which is either a monohydroxy or polyhydroxy compound. Said aromatic hydroxyl compound has a hydroxy group attached directly to the aromatic nucleus. By the process of the invention, hydroxyalkylation occurs in the presence of a catalyst selectively active in the predominant oxyalkylation of aromatic hydroxyl groups, said catalyst selected from the group consisting of zinc, magnesium and a zinc or magnesium salt as defined. The reaction mixture can include an aliphatic hydroxyl-containing compound, a neutral phosphorus compound, and aliphatic or aromatic anhydrides or mixtures thereof to enhance the flame-retardant properties of the oxyalkylated product.

9 Claims, No Drawings

PROCESS FOR PREPARING HALOGENATED AROMATIC HYDROXY ETHERS

This is a division of application Ser. No. 753,650, filed Dec. 23, 1976, now U.S. Pat. No. 4,094,910.

BACKGROUND OF THE INVENTION

1. Field of the Invention

This invention relates to halogenated oxyalkylated aromatic products useful in making polyurethane foams.

2. Description of the Prior Art

When flame-retardant properties are required in polyurethane foams, it is known to use halogenated compounds and/or derivatives of phosphorus acids as active hydrogen compounds in polyurethane formulations. Often boron or antimony compounds are used in addition to said halogenated compounds to obtain improved flame-retarding properties as the result of synergism between said halogenated compounds and said boron or antimony compounds. Certain halogenated compounds, namely, monomeric materials while effective in imparting a degree of flame resistance to polyurethane plastics suffer the disadvantage of impairing the mechanical and physical properties of the polyurethane product since such materials are generally incompatible therewith and, therefore, function as diluents and fillers in the polyurethane composition.

It is known to use oxyalkylated polyols in making polyurethane foams; such polyols generally being prepared by reacting a polyhydric alcohol with an alkylene oxide in the presence of an alkaline catalyst. The alkaline catalyst which remains in the polyol is known to interfere with the reaction between the oxyalkylated polyol and the polyisocyanate used in making the polyurethane.

It is known to utilize a Friedel-Crafts catalyst such as stannic chloride to catalyze the addition of an epoxide with a polyhydric alcohol to produce a polyol. Similar catalysis occurs utilizing a phenol in place of the polyhydric alcohol as disclosed by Marple in U.S. Pat. No. 2,428,235. Conventional Friedel-Crafts catalysts are disclosed to catalyze the reaction of an aromatic or aliphatic halogenated compound with an alkylene oxide in U.S. Pat. No. 3,660,318 and to produce flame-retarding halogenated compounds useful in the preparation of polystyrene compositions exhibiting flame-retardant properties.

The use of an alkaline catalyst or an alkali salt of a pentahalophenol is disclosed as required for the production of pentahalophenoxy alkanols by the reaction of an alkylene oxide or a halohydrin according to the teachings of U.S. Pat. No. 2,416,263.

It is also known from U.S. Pat. No. 3,957,922 to prepare oxyalkylated products from a non-phenolic active hydrogen-containing compound utilizing as a catalyst a complex of a phenol and aluminum or iron.

None of the patents disclose the oxyalkylation of an aromatic hydroxyl-containing compound by the use of an epoxide compound utilizing as catalysts the compositions disclosed hereinbelow.

It is, therefore, an object of this invention to provide a new process for preparing halogenated aromatic hydroxy ethers by an oxyalkylation reaction which reaction does not require the use of the oxyalkylation catalysts of the prior art.

SUMMARY OF THE INVENTION

This invention provides a process for making halogenated aromatic hydroxy ethers from halogenated aromatic hydroxyl-containing compounds (phenols), said ethers being particularly useful in processes for the preparation of polyurethane foams. As used herein, the term "halogen" is defined as chlorine, bromine and iodine. The process comprises forming a mixture of a halogenated aromatic hydroxyl-containing compound, an epoxide compound and, as a catalyst, zinc, magnesium or a zinc or magnesium compound selected from the group consisting of halide and nitrate salts of zinc or magnesium, weak acid salts of zinc or magnesium and mixtures thereof; oxyalkylating said hydroxyl-containing compound by reacting the epoxide compound such as an alkylene oxide with the halogenated aromatic hydroxyl-containing compound; and recovering an oxyalkylated product of the desired properties as indicated by the acid number or hydroxyl number being reduced to the required level. Useful weak acid salt catalysts are the salts of magnesium or zinc, i.e., the carbonate, silicate, acetate, benzoate, citrate, formate, oxalate, stearate, tartrate salts and mixtures thereof. The reaction mixture can also contain an aliphatic hydroxyl-containing compound, a substantially neutral phosphorus compound and/or an organic acid anhydride or mixtures thereof to enhance flame-retardant properties of the oxyalkylated product of the process. Upon attainment of the desired properties of the oxyalkylated product, for instance, molecular weight, hydroxyl number and acid number, the reaction is terminated.

DETAILED DESCRIPTION OF THE INVENTION

According to this invention, a process is disclosed which permits the manufacture of essentially neutral compounds by the selective oxyalkylation of halogenated aromatic hydroxyl-containing compounds in the presence of a catalytic amount of zinc, magnesium or a zinc or magnesium salt which is defined below. By the process of the invention, the halogenated aromatic hydroxyl-containing compound oxyalkylates rapidly, with oxyalkylation taking place predominantly at the aromatic hydroxyl site and generally with insignificant chain extension or reaction of any aliphatic hydroxyl groups which are present. A surprising feature of this invention is that the oxyalkylation reaction is predominantly selective toward halogenated aromatic hydroxyl-containing compounds and, as a result, occurs only to an extent substantially limited by the aromatic hydroxyl content of the reaction mixture. Approximately 1 to about 4 moles of oxide residue per available halogenated aromatic hydroxyl group are added by the process of the invention. Such limited oxyalkylation of a halogenated aromatic hydroxyl-containing compound is particularly advantageous in providing a halogenated additive for use in the preparation of flame-retardant materials, particularly flame-retardant polyurethane foams.

For maximum performance of the halogenated oxyalkylated compound, it is necessary that a predominant proportion, preferably as large as possible a proportion, of the compound be halogenated so as to perform its intended function as a flame-retardant additive. On the other hand, it is often necessary to improve compatibility of the halogenated aromatic hydroxyl-containing compound. By oxyalkylation there is obtained either or both a change in physical form, for instance, from a solid to a liquid at ambient temperatures or an increased compatibility with the composition to be rendered flame-retardant, for instance a polyurethane foam. It has been found that a desirable improvement in compatibility can be provided generally by the addition of 1 to 4 moles of oxide per available halogenated aromatic hydroxyl group and thus the process of the instant invention provides compatible oxyalkylated halogenated compounds having maximum effectiveness as flame-retardant additives for polymeric materials. Catalysts such as strong bases, strong acids and weak acid salts of strong bases such as sodium or potassium acetates are known to be effective in the non-selective catalysis of the oxyalkylation of both aromatic or aliphatic hydroxyl-containing compounds. It is therefore surprising that selective oxyalkylation, as disclosed herein, can be obtained with magnesium or zinc metal or magnesium metal or zinc salts selected from the group consisting of the halides or nitrates and weak acid salts thereof such as the carbonates and acetates. By the process of this invention, a halogenated aromatic hydroxyl-containing compound can be selectively oxyalkylated with an alkylene oxide in the presence of a diluent such as an aromatic solvent, for instance, toluene, xylene, benzene, etc., or an aliphatic hydroxyl-containing compound such as an aliphatic polyol with insignificant addition of the oxide to any aliphatic hydroxyl groups present in the polyol. The aromatic solvent can be conveniently stripped out of the oxyalkylated product while the aliphatic polyol can remain to react with an isocyanate in the subsequent use of the halogenated oxyalkylated polyol in the production of a polyurethane foam. In addition, both aromatic and aliphatic anhydrides, either halogenated or non-halogenated or a phosphorus compound can be added to the halogenated aromatic hydroxyl-containing compound and epoxide compound mixture at any time during the course of the reaction. Representative compounds are disclosed below. This provides a convenient method of obtaining a product containing phosphorus or a mixed halide, for instance, tribromophenol and tetrachlorophthalic anhydride, with a minimum of 1 mole of oxide per mole on the halogenated aromatic hydroxyl-containing compound. In the process of the invention, the anhydride reacts with the oxypropylated halogenated aromatic hydroxyl-containing compound to form a half (acid) ester which is further oxypropylated to form the diester.

Any polyol such as polyalkylene polyether may be used as a diluent, as disclosed above. Such polyol is the polymerization product of an alkylene oxide with a polyhydric alcohol. Any suitable polyhydric alcohol having equivalent weight of at least about 30 can be used as an initiator in the production of the polyalkylene polyether polyol. Examples are as follows: Aliphatic diols, triols, etc., such as ethylene glycol, propylene glycol, glycerin, trimethylolpropane, pentaerythritol, 1,2,6-hexanetriol, sorbitol, maltose, sucrose, and alpha-methyl glucoside. The polyalkylene polyethers can also be prepared by the reaction of a polyhydric alcohol with alkylene oxides such as epihalohydrins illustrated by epichlorohydrin and epibromohydrin; aralkylene oxides such as styrene oxide can also be used. The polyalkylene polyether polyols can have either primary or secondary hydroxyl groups and, preferably, are polyethers prepared from the reaction of alkylene oxides with polyhydric alcohols having from 2 to 8 hydroxyl groups. The polyalkylene polyether polyols can be prepared by any known process such as, for example, the process disclosed by Wurtz in 1859 and Encyclopedia of Chemical Technology, Vol. 7, pp. 257–262, published by Interscience Publishers, Inc. (1951) or in U.S. Pat. No. 1,922,459. Examples of polyethers which can be used include the alkylene oxide addition products of glycols, trimethylolpropane, glycerin, pentaerythritol, sucrose, sorbitol, propylene glycol, and 2,2-(4,4'hydroxyphenyl)propane and blends thereof having equivalent weights of about 80 to 5000.

It is also possible by the use of zinc, magnesium or the zinc or magnesium salt catalysts of the invention to limit the oxyalkylation of an aliphatic hydroxyl-containing compound that would otherwise normally take place where the mixture contains, in addition to an aromatic hydroxyl-containing compound i.e. a phenol, iron or aluminum which as indicated by the teachings of U.S. Pat. No. 3,957,922 form a complex with a phenol capable of catalyzing the oxyalkylation of aliphatic hydroxyl-containing compounds. Thus the presence of zinc, magnesium or the zinc or magnesium salt catalysts of the invention can act to limit the oxyalkylation of an aliphatic hydroxyl-containing compound present in admixture with a phenol, iron or aluminum.

The oxyalkylation products of this invention are liquid mixtures having an equivalent weight range of from 185 to about 850 and an acid number of less than 1. They contain between 1 to about 5, preferably 1 to about 4 moles of oxide per available aromatic hydroxyl group.

The metals zinc and magnesium or zinc or magnesium salts of the invention can be present in a catalytic amount such as a concentration in the mixture of reactants of from about 50 to about 20,000 parts per million (ppm). Preferably, a concentration of from about 250 to about 2500 parts per million in the mixture of reactants is used. The amount of catalyst of the invention present during oxyalkylation is believed to primarily affect the rate rather than the extent of addition. The halogenated aromatic hydroxyl-containing compound is a phenol. The expression "a phenol", as used in this specification and in the appended claims, is intended to denote a compound generally recognized in the art as an aromatic compound containing a hydroxyl group linked directly to a carbon atom of an aromatic nucleus. The phenol employed as a reactant in this process can be either a monohydroxy or a polyhydroxy compound and contains halogen substituents linked directly to the aromatic nucleus. The phenol can be a diphenol such as bisphenol A. Representative compounds include the halogenated forms of phenol, for instance, pentachlorophenol, 2,4,6-trichlorophenol, the dichlorophenols, tetrachlorophenols, and the like, halogenated cresols, xylenols, ethylphenol, propylphenol, tertiary butylphenol, tertiary amylphenol, octylphenol, resorcinol, catechol, and the like. The useful bromo-substituted phenols are illustrated by pentabromophenol, 2,4,6-tribromophenol, tetrabromophenol, tetrabromo-bisphenol A and the like.

Epoxides which may be employed in the preparation of the polyols of the present invention include alkylene oxides such as ethylene oxide, propylene oxide, the isomeric normal butylene oxides, hexylene oxide, octylene oxide, dodecene oxide, methoxy and other alkoxy propylene oxides, styrene oxide, and cyclohexene oxide. Halogenated alkylene oxides may also be used, such as epichlorohydrin, epiiodohydrin, epibromohydrin, 3,3-dichloropropylene oxide, 3-chloro-1,2-epoxypropane, 3-chloro-1,2-epoxybutane, 1-chloro-2,3-epoxybutane, 3,4-dichloro-1,2-epoxybutane, 1,4-dichloro-2,3-epoxybutane, 1-chloro-2,3-epoxybutane, and 3,3,3-trichloropropylene oxide. Mixtures of any of the above alkylene oxides may also be employed.

Surprisingly, it has been found in the studies leading up to this invention that other metal and metal compounds, which have been generally associated with or grouped with zinc, magnesium or zinc or magnesium salts, as defined herein in the prior art for catalytic purposes in other chemical processes, are not as selectively effective as are the oxyalkylation reaction catalysts of the invention. For instance, metals such as boron, palladium, titanium, strontium, nickel and copper and compounds thereof are substantially inferior to zinc, magnesium or the zinc or magnesium salts of the invention as catalysts for the selective oxyalkylation of halogenated phenols. In addition, while compounds of tin and cobalt are effective as oxyalkylation catalysts for halogenated phenols, since these catalysts are effective for the oxyalkylation of aliphatic hydroxyl-containing compounds as well as aromatic hydroxyl-containing compounds, their use would result in substantially higher oxide consumption to obtain the same desirable low acid number as obtained using the selective oxyalkylation catalysts of the invention.

The process of this invention can be carried out in a conventional polymerization reaction in a vessel in which there is provided a suitable stirring apparatus, pressure and temperature indicating means, and a means for introducing an epoxide compound such as alkylene oxide into the reaction vessel and the mixture contained therein. The reaction vessel can under certain circumstances be open to the atmosphere and fitted with suitable condensing devices or the reaction mixture can be a pressure vessel. Preferably the oxyalkylation reaction is carried out in an inert atmosphere and at an elevated pressure. The inert atmosphere can be provided by nitrogen gas or any inert gas and is used to drive the air from above the surface of the reaction mixture.

Upon completion of the oxyalkylation reaction, the mixture is generally vented to the atmosphere and subsequently heated at atmospheric or reduced pressure at a temperature sufficient to remove undesired volatile material. Thus, the mixture can be heated to a temperature of from about 75° C. to about 250° C. to remove water, excess or unreacted alkylene oxide, inert gases, alcoholic by-products resulting from transesterification in the mixture and the like. Solid materials contained in the liquid oxyalkylated product mixture can be separated by filtration.

Should it be required to remove the zinc or magnesium metal from the oxyalkylated product mixtures, this can be accomplished by filtration. Since the magnesium or zinc salts of the invention generally do not interfere in the making of polyurethane foams, the preferred end use for the oxyalkylated products of the invention, these need not ordinarily be removed.

The proportion of the epoxide compound employed in the process is usually considerably in excess of the molar amount of the halogenated phenol used. Necessarily, a molecular ratio of at least 1 mole of the epoxide compound to 1 mole of the halogenated phenol is used. The reaction is conducted at a temperature generally of from about 90° C. to about 250° C., preferably a temperature of from about 100° C. to about 150° C. The reaction can be completed subsequent to combination of the materials in the mixture by heating the reaction mixture to its boiling temperature except when a low boiling epoxide compound such as ethylene oxide, propylene oxide, etc., is used. In such cases it is desirable to maintain pressure on the reaction vessel at least equal to the pressure required to permit reaction at the desired temperature. The process of the invention can be completed in a variety of ways and is adaptable to batchwise, intermittent and continuous operation.

The oxyalkylation reaction can be carried out at a relatively wide range of pressures but is usually conducted at pressures in the range of about 1 atmosphere to about 10 atmospheres. Preferably, the oxyalkylation reaction is carried out at an elevated pressure of about 1 to about 8 atmospheres and, most preferably, at a pressure of about 3 to about 6 atmospheres. In commercial scale operations, the reaction is preferably carried out in an inert atmosphere such as nitrogen or the like, in order to minimize color formation due to oxidation. The time necessary to carry out the oxyalkylation reaction depends on the specific halogenated aromatic hydroxyl-containing compound employed, the process temperature and pressure and the desired acid number. Reaction is usually considered complete when the product has an acid number of less than one. The reaction time can vary from about 1 hour to 100 hours depending on the conditions of the reaction but should be complete within about 15 to about 75 hours. High pressures permit higher concentrations of the reactants and operation at higher temperatures so as to allow faster reaction rate.

As previously described, the oxyalkylated products of the invention can be utilized in the manufacture of polyurethanes to render said polyurethanes flame-retardant. Details of the manufacture of polyurethanes in which the hereindescribed oxyalkylation products can be used is now well known in the technical literature and in the prior art. U.S. Pat. No. 3,639,541, incorporated herein by reference, and the patents referred to therein describe the procedures for making polyurethane foams by the incorporation of oxyalkylation products.

When it is desired to incorporate phosphorus into the oxyalkylated product to enhance the flame-retardant properties thereof, neutral phosphorus esters are preferred. Both pentavalent and trivalent phosphorus esters are useful. These latter esters may be defined as follows:

(i)

wherein each of $R^1$, $R^2$, and $R^3$ is a hydrocarbon radical free of aliphatic unsaturation containing from 1 to 8 carbon atoms, or such a hydrocarbon radical containing halogen substitution therein, preferably chlorine and/or bromine.

The former esters may be defined as follows:

(ii)

wherein each $R^1$, $R^2$, and $R^3$ are as defined above.

One or more of these compounds can be added to the reaction mixture in an amount sufficient to provide from 1 to about 8 percent by weight of phosphorus in the oxyalkylated product.

Examples of these trivalent phosphorus esters of type (i) include the aliphatic, aromatic and alkylaryl phosphites such as trimethylphosphite, triethylphosphite, tri-n-propylphosphite, triphenylphosphite, mixed alkylarylphosphites such as diethyl(phenyl)phosphite, and numerous others satisfying the indicated formula, known in the art. Examples of these pentavalent phosphorus esters of type (ii) include the aliphatic, aromatic and alkylaryl phosphates such as trimethylphosphate, triethylphosphate, tri-n-propylphosphate, triphenylphosphate, mixed alkylaryl phosphates such as diethyl(phenyl)phosphate and the like. Other phosphorus compounds can be used alone or in mixtures with said phosphorus compounds in the reaction mixture. However, we have found that these phosphorus esters work best and most economically to obtain the oxyalkylated products of this process.

An aliphatic, aromatic or alkylaryl acid anhydride can also be incorporated into the oxyalkylation reaction mixture in order to enhance the flame-retardant properties of the produced polyol. The acid anhydride can be present in the reaction mixture in an amount up to about 1:1 mole ratio of phenol to anhydride.

Illustrative of the organic acid anhydrides suitable for use in the process of this invention are dichloromaleic anhydride, tetrabromophthalic anhydride, tetrachlorophthalic anhydride, 1,4,5,6,7,7-hexachlorobicyclo(2.2.1)-5-heptane-2,3-dicarboxylic anhydride (also known as chlorendic anhydride), 1,4,5,6,7,7-hexachloro-2-methylbicyclo(2.2.1)-5-heptene-2,3-dicarboxylic anhydride, 1,4,5,6,7,7-hexachloro-bicyclo(2.2.1)-5-heptene-2-acetic-2-carboxylic anhydride, 5,6,7,8,9,9-hexachloro-1,2,3,4,4a,5,8,8a-octahydro-5,8-methano-2,3-naphthalene dicarboxylic anhydride, 1,2,3,4,5,6,7,7-octachloro-3,6-methano-1,2,3,6-tetrahydrophthalic anhydride, phthalic anhydride, maleic anhydride, trimellitic anhydride and mixtures of halogenated and non-halogenated anhydrides, and the like.

The relative amounts of the reactants can vary over a wide range depending upon the phosphorus and halogen content and the hydroxyl number and molecular weight desired in the oxyalkylated product mixture. Usually an oxyalkylated product of the present invention intended for use in the manufacture of a flame-retardant polyurethane would contain about 5 to about 55 percent by weight of halogen and about 0.5 to about 8 percent by weight phosphorus in the product mixture.

The oxyalkylated products containing halogen and phosphorus and prepared in the aforementioned manner are capable of imparting excellent flame-resistant properties to polyurethanes such as coatings, foams, and the like, and thus are useful for compounding such formulations. The oxyalkylated products of the present invention are particularly useful in preparing pour-in-place, slab stock and sprayable polyurethane foam systems which can be used in the insulation, building, and construction industries.

The following examples illustrate the nature of the invention. In this specification and claims, all parts are by weight and all temperatures are in degrees centigrade unless otherwise indicated.

The following general procedure describes the equipment used in conducting the oxyalkylation reactions illustrated below:

A reaction flask equipped with a bubbler, thermometer, reflux condenser, and addition funnel is charged with the halogenated aromatic hydroxyl-containing compound, zinc and/or magnesium, or a zinc or magnesium compound. The mixture is heated to approximately 140° C. over a period of ½ to 1 hour and then the epoxide is added until the acid number is less than one or until steady refluxing occurs. If desired, a low boiling diluent or an aliphatic polyol, an aliphatic or aromatic anhydride or any liquid or low melting aliphatic hydroxyl-containing compound can be introduced at various stages of the operation. A compatible phosphorus compound can be introduced at any stage of the reaction. At the end of the reaction period the mixture is stripped for 2 hours at 80° C. and one millimeter of mercury pressure to remove volatiles and the product filtered to remove any solid material present.

EXAMPLE 1 (COMPARATIVE)

This comparative example illustrates the oxypropylation of tribromophenol with no catalyst. A 1-liter flask was charged with 331 grams of tribromophenol. The contents of the flask were heated to 150° C. and propylene oxide addition was commenced. After 120 hours of reaction, the mixture was found to have an acid number of approximately 50. The mixture was stripped for 2 hours at 80° C. to 82° C. under a pressure of 2 millimeters of mercury and the 406 grams of polyol remaining had an acid number of 57 and had added 1.3 moles of propylene oxide per mole of tribromophenol. The high acid number of the product indicates that these no catalyst conditions favor chain extension (i.e., aliphatic hydroxyl oxyalkylation) rather than oxyalkylation of the aromatic hydroxyl group.

EXAMPLE 2

This example illustrates the use of magnesium turnings as a catalyst for the oxypropylation of tribromophenol. A 1-liter flask was charged with 331 grams of tribromophenol and 1 gram of magnesium turnings. The mixture was heated to 150° C. and propylene oxide addition was started. The oxypropylation reaction was allowed to proceed for a period of 64 hours after which time the acid number was less than one. The mixture was then stripped for 2 hours at a temperature of 79° C. to 84° C. under a pressure of 4 to 5 millimeters of mercury. The product obtained in the amount of 412 grams had an acid number of one and analysis showed that 1.38 moles of propylene oxide per mole of tribromophenol had been added. These results indicate that oxyalkylation of the aromatic hydroxyl is the predominant reaction rather than chain extension.

EXAMPLE 3

The procedure and proportions of Example 2 are repeated substituting 1 gram of zinc chloride and 165 grams of tribromophenol. The product obtained had an acid number of 0.72, a hydroxyl number of 125 and analysis showed that 3.8 moles of propylene oxide per mole of tribromophenol had been added.

EXAMPLE 4

The procedure of Example 2 was repeated substituting 8.5 grams of magnesium chloride containing 6 moles of water of hydration for the magnesium turnings of Example 2. After about 70 hours of reaction, the product had an acid number of 0.18 and analysis showed 1.33 moles of propylene oxide per mole of tribromophenol had been added.

EXAMPLE 5

The procedure of Example 2 was repeated using 9 grams of magnesium acetate having 4 moles of water of hydration. After about 50 hours of reaction, the product had an acid number of 0.88 and analysis showed 1.16 moles of propylene oxide had been added per mole of tribromophenol.

EXAMPLE 6

The procedure of Example 2 was repeated using 3.5 grams of magnesium carbonate. After about 80 hours of reaction, the acid number of the product was 0.3 and analysis showed 1.49 moles of propylene oxide had been added per mole of tribromophenol.

EXAMPLES 7–26

Using a similar procedure to that shown in Example 2, trichlorophenol, tetrachlorobisphenol-A, tetrabromobisphenol-A and pentachlorophenol are oxypropylated using in turn the five catalysts disclosed in Examples 2–6. Products are obtained having low acid numbers at propylene oxide add-on of less than 4 moles per mole of halogenated phenol used.

EXAMPLES 27–46

Examples 7–26 are repeated using ethylene oxide substituted for propylene oxide to obtain results comparable to those obtained in Examples 7–26.

EXAMPLE 47

This example illustrates the use of an aliphatic propylene oxide polyol as a diluent or reaction medium for the reactants. A 1-liter flask was charged with 331 grams of tribromophenol and 1 gram of magnesium. The mixture was heated at approximately 150° C. for one hour and then 302.5 grams of a polyoxypropylene polyol based upon pentaerythritol having a molecular weight of 400 and a hydroxyl number of 560 sold under the trademark "PLURACOL ® Polyol PeP-450", was added and oxypropylation continued 10 hours until the acid number was less than one. The product obtained had an acid number of 0.73 and analysis showed that 1.2 moles of propylene oxide were added per mole of tribromophenol.

EXAMPLE 48 (COMPARATIVE)

This comparative example illustrates the oxypropylation of tetrabromobisphenol-A with no catalyst present in a reaction medium containing an aliphatic alkylene oxide polyol having the same composition as described in Example 47. A 1-liter flask was charged with 544 grams of tetrabromobisphenol-A and 275 grams of the aliphatic polyol described in Example 47 and sold under the trademark "PLURACOL ® Polyol PeP-450". After heating to about 150° C., propylene oxide was added over a period of 190 hours. The product obtained had an acid number of 28.7.

EXAMPLE 49

This example illustrates the use of a halogenated aromatic anhydride as a component of the oxyalkylation mixture. A 1-liter flask was charged with 544 grams of tetrabromobisphenol-A and 1 gram of magnesium. As a diluent, 50 milliliters of xylene were added. Two grams of magnesium acetate were added and the mixture oxypropylated until the acid number was less than one and then 286 grams of tetrachlorophthalic anhydride were added and oxypropylation continued until the acid number was again less than one. The product obtained had the following properties: OH number 98.8; percent bromine 28.8; percent chlorine 12.7; and analysis indicated that 4.8 moles of propylene oxide had been added per mole of the total phenol and anhydride present.

EXAMPLE 50

This example illustrates the use of a phosphorus ester as a component of the oxyalkylation reaction mixture. A 1-liter flask was charged with 544 grams of tetrabromobisphenol-A, 100 grams of triphenyl phosphite, 170 grams of the aliphatic propylene oxide polyol more fully described in Example 47 and sold under the trademark "PLURACOL ® Polyol PeP-450", and 4 grams of magnesium carbonate. The mixture was oxypropylated until the acid number was less than one. The product obtained had a percent phosphorus of 1.1 and analysis showed that 2.9 moles of propylene oxide had been added per mole of tetrabromobisphenol-A.

EXAMPLE 51

This example illustrates the use of magnesium to limit the oxyalkylation of the resulting aliphatic hydroxyl of the aromatic hydroxyl-containing compound once 1 mole of oxide is added to the aromatic hydroxyl-containing compound where the mixture contains iron or aluminum as contaminants.

Using commercial grade iron and aluminum-contaminated pentachlorophenol without further purification, a one-liter flask was charged with 266 grams of pentachlorophenol and one gram of magnesium. Propylene oxide was added until the acid number was less than one and the mixture stripped for two hours at 88° C. at 1-2 millimeters mercury. The product obtained had an acid number of 0.4 and 11 moles of propylene oxide had been added per mole of pentachlorophenol. (Under similar conditions without the magnesium catalyst, 30–50 moles of oxide would have been added per mole of pentachlorophenol).

EXAMPLES 52–58

Example 5 is repeated substituting zinc nitrate, zinc benzoate, magnesium citrate, zinc formate, magnesium stearate, zinc oxylate and magnesium tartrate for the magnesium acetate of Example 5. The products obtained have low acid numbers at a propylene oxide add-on of less than four moles per mole of tribromophenol.

EXAMPLE 59

Into a one-liter flask there was charged 544 grams of tetrabromobisphenol-A, 275 grams of the polyol described in Example 47 and sold under the trademark "PLURACOL ® Polyol PeP-450", and 10 grams of magnesium nitrate. Propylene oxide addition into the mixture obtained was started and continued about 30 hours. After stripping, the mixture for 2 hours at 84° C.–86° C. at 2–4 millimeters of mercury, a product was obtained in the amount of 963 grams. The acid number was 0.2 and 2.3 moles of oxide had been added for each mole of tetrabromobisphenol-A.

EXAMPLE 60

Example 59 was repeated using the following ingredients: 400 grams of tetrabromobisphenol-A. 200 grams of the polyol described in Example 47 and sold under the trademark "PLURACOL ® Polyol PeP-450", and 2.5 grams of zinc. The mixture was heated to 150° C. and propylene oxide addition started. After 78 hours reaction, the product obtained had an acid number of 1 and 6.3 moles of oxide had been added per mole of tetrabromobisphenol-A or 3.2 moles of oxide per phenolic hydroxyl.

The embodiments of the invention in which an exclusive property or privilege is claimed are defined as follows:

1. A process for the selective oxyalkylation of a halogenated phenol to produce hydroxy ethers wherein the process is carried out at a reaction temperature of about 90° C. to about 250° C. for a period of about one hour to about 100 hours using a catalyst concentration by weight of about 50 to about 20,000 parts per million, comprising:
    (a) reacting a composition comprising said halogenated phenol in admixture with an aliphatic hydroxyl-containing compound with
    (b) an alkylene oxide selected from the group consisting of ethylene oxide, propylene oxide, the isomeric normal butylene oxides, hexylene oxide, octylene oxide, dodecene oxide, methoxy and other alkoxy propylene oxides, styrene oxide, and cyclohexene oxide; halogenated alkylene oxides selected from the group consisting of epichlorohydrin, epiiodohydrin, epibromohydrin, 3,3-dichloropropylene oxide, 3-chloro-1,2-epoxypropane, 3-chloro-1,2-epoxybutane, 1-chloro-2,3-epoxybutane, 3,4-dichloro-1,2-epoxybutane, 1,4-dichloro-2,3-epoxybutane, 1-chloro-2,3-epoxybutane, and 3,3,3-trichloropropylene oxide; and mixtures of any said alkylene oxides in the presence of
    (c) a catalyst selected from the group consisting of zinc, magnesium, a weak acid salt of zinc or magnesium, a zinc or magnesium halide or nitrate and mixtures thereof wherein said weak acid salt is selected from the group consisting of the carbonate, silicate, acetate, benzoate, citrate, formate oxylate, stearate, tartrate, and mixtures thereof.

2. The process of claim 1 wherein said selective oxyalkylation is conducted in the presence of a phosphorus compound; an aliphatic, aromatic, or alkylaryl acid anhydride; or mixtures thereof.

3. The process of claim 2 wherein said halogenated phenol hydroxyl-containing compound is selected from the group consisting of tribromophenol, trichlorophenol, tetrabromophenol, tetrabromobisphenol-A, tetrachlorobisphenol-A and pentachlorophenol.

4. The process of claim 3 wherein said zinc or magnesium salt is selected from the group consisting of magnesium carbonate, zinc carbonate and mixtures thereof and said alkylene oxide is selected from the group consisting of propylene oxide and ethylene oxide.

5. The process of claim 3 wherein said catalyst is a mixture of magnesium and magnesium acetate, said alkylene oxide is propylene oxide, said halogenated phenol is tetrabromobisphenol-A, and said anhydride is tetrachlorophthalic anhydride.

6. The process of claim 3 wherein said halogenated phenol is tetrabromobisphenol-A, said catalyst is magnesium carbonate, said alkylene oxide is propylene oxide, and said phosphorus compound is triphenylphosphite.

7. The process of claim 4 wherein said magnesium salt is magnesium carbonate and said alkylene oxide is propylene oxide and said halogenated phenol is tribromophenol.

8. The process of claim 7 wherein said hydroxy ethers have an equivalent weight range of from 185 to about 850, an acid number of less than 1 and contain between 1 to about 5 moles of alkylene oxide for each mole of halogenated phenol.

9. The process of claim 8 wherein said reaction is conducted at a pressure of about 1 atmosphere to about 10 atmospheres.

* * * * *